(12) United States Patent
Zhang (10) Patent No.: US 12,102,264 B2
(45) Date of Patent: Oct. 1, 2024

(54) AIR FRYER APPLICABLE FOR COOKING PIZZA, NOVEL FRYING BASKET FOR AIR FRYER AND NOVEL AIR FRYER

(71) Applicant: NINGBO CARELINE ELECTRIC APPLIANCE CO., LTD., Zhejiang (CN)

(72) Inventor: Yichi Zhang, Zhejiang (CN)

(73) Assignee: NINGBO CARELINE ELECTRIC APPLIANCE CO., LTD., Ningo (CN)

( * ) Notice: Subject to any disclaimer, the term of this patent is extended or adjusted under 35 U.S.C. 154(b) by 690 days.

(21) Appl. No.: 17/150,092

(22) Filed: Jan. 15, 2021

(65) Prior Publication Data

US 2021/0369050 A1    Dec. 2, 2021

(30) Foreign Application Priority Data

| May 26, 2020 | (CN) | ......................... | 202020902288.2 |
| May 26, 2020 | (CN) | ......................... | 202020902333.4 |
| May 26, 2020 | (CN) | ......................... | 202020902342.3 |
| May 26, 2020 | (CN) | ......................... | 202020903826.X |
| Aug. 19, 2020 | (CN) | ......................... | 202021736503.2 |

(51) Int. Cl.
*A47J 37/06* (2006.01)
*A47J 36/20* (2006.01)
*A47J 36/34* (2006.01)

(52) U.S. Cl.
CPC ............ *A47J 37/0658* (2013.01); *A47J 36/20* (2013.01); *A47J 36/34* (2013.01); *A47J 37/0641* (2013.01); *A47J 37/0664* (2013.01)

(58) Field of Classification Search
CPC .... A47J 37/06; A47J 37/0658; A47J 37/0641; A47J 37/0664; A47J 37/34; A47J 37/20; A47J 36/06; A47J 27/004; A47J 27/0802; A47J 27/09; A47J 43/044; A47J 2043/0449; A47J 27/00; A47J 27/08; A47J 27/092; A47J 36/025; A47J 36/08; A47J 36/10;

(Continued)

(56) References Cited

U.S. PATENT DOCUMENTS 2,221,098 A * 11/1940 Langsam ................ F24B 1/202
                                                              126/30
4,817,509 A *  4/1989 Erickson ............. A47J 37/0641
                                                              219/400

(Continued)

FOREIGN PATENT DOCUMENTS

| CN | 203539136 U | * | 4/2014 |
| CN | 205831617 U | * | 12/2016 |

(Continued)

*Primary Examiner* — Phuong T Nguyen
(74) *Attorney, Agent, or Firm* — Warner Norcross + Judd LLP (57) ABSTRACT

The present disclosure discloses an air fryer applicable for cooking a pizza, including a bottom bracket provided in a cooking cavity of the air fryer, wherein an air duct plate is provided between an upper part of the bottom bracket and a heating pipe on the top of the cooking cavity, a passing-air reflux port is provided in the middle of the air duct plate, an edge of the air duct plate extends downwards to form a hot air passage with an inner wall of the cooking cavity, and a pizza placement cavity is formed between the bottom bracket and the air duct plate.

13 Claims, 10 Drawing Sheets

(58) Field of Classification Search
CPC .. A47J 36/12; A47J 36/18; A47J 36/20; A47J 36/22; A47J 37/00; A47J 37/12; A47J 37/1204; A47J 37/1209; A47J 37/1214; A47J 537/1219; A47J 537/1266; A47J 37/1285; A47J 37/129; A47J 37/1295
USPC ....... 219/432, 433, 436, 438, 442, 472, 474, 219/524, 525, 521; 99/348, 353, 372, 99/376, 324, 325, 330–343, 369, 99/400–418, 422, 425, 426, 430, 440, 99/444, 447, 448, 449, 451, 483, 495, 99/501

See application file for complete search history.

(56) References Cited

U.S. PATENT DOCUMENTS

| | | | |
|---|---|---|---|
| 6,747,250 B1 * | 6/2004 | Cha | A47J 37/0623 219/400 |
| 6,936,795 B1 * | 8/2005 | Moon | A47J 37/0629 219/400 |
| 7,360,533 B2 * | 4/2008 | McFadden | A21B 1/245 219/400 |
| 8,835,810 B2 * | 9/2014 | Moon | A21B 1/22 219/400 |
| 10,307,018 B2 * | 6/2019 | Van Der Burg | A47J 37/0641 |
| 10,813,494 B2 * | 10/2020 | Eberhart | A47J 36/38 |
| 11,045,047 B2 * | 6/2021 | Popeil | F24C 15/08 |
| 11,375,850 B2 * | 7/2022 | Sladecek | A47J 39/003 |
| 2010/0323077 A1 * | 12/2010 | Moon | A47J 43/283 426/523 |
| 2019/0045973 A1 * | 2/2019 | Gill | A47J 37/0629 |
| 2019/0167036 A1 * | 6/2019 | Pool, III | A21B 3/131 |

FOREIGN PATENT DOCUMENTS

| | | | | |
|---|---|---|---|---|
| CN | 205993291 U | * | 3/2017 | |
| WO | WO-2010063992 A1 | * | 6/2010 | A47J 37/0658 |
| WO | WO-2015176973 A1 | * | 11/2015 | A21B 1/26 |

* cited by examiner

AIR FRYER APPLICABLE FOR COOKING PIZZA, NOVEL FRYING BASKET FOR AIR FRYER AND NOVEL AIR FRYER

BACKGROUND

The present disclosure relates to the field of air fryers, and in particular, to an air fryer applicable for cooking pizza, a novel frying basket for an air fryer and a novel air fryer.

Air fryers are kitchen appliances that are now favorite. The air fryer is a machine that can use air to perform "frying", and mainly uses air to replace hot oil originally in the pan to make food cooked; meanwhile, the hot air also blows away the moisture on the surface layer of food, thus achieving the effect of making the ingredients almost fried.

SUMMARY

An embodiment of the present disclosure provides an air fryer applicable for cooking pizza, which includes a bottom bracket provided in a cooking cavity of the air fryer, an air duct plate is provided between an upper part of the bottom bracket and a heating pipe on the top of the cooking cavity, a passing-air reflux port is provided in the middle of the air duct plate, an edge of the air duct plate extends downwards to form a hot air passage with an inner wall of the cooking cavity, and a pizza placement cavity is formed between the bottom bracket and the air duct plate.

An embodiment of the present disclosure further provides a novel frying basket for an air fryer, including a basket body, a bottom surface of the basket body is provided with bottom convex bulges, and the bottom convex bulges are provided with first bottom inlet holes.

An embodiment of the present disclosure further provides a novel air fryer, including an air fryer body. A fan assembly is provided inside the air fryer body close to the top, a motor is mounted on a side of the fan assembly, and the motor is connected to the fan assembly by a transmission assembly so as to drive the fan assembly to rotate. The transmission assembly includes a driven wheel mounted on a rotating shaft and a driving wheel mounted at an upper end of the motor shaft of the motor, the driven wheel and the driving wheel are connected by a transmission belt, a bracket is mounted on the lower side of the transmission assembly, and the bracket is configured to horizontally limit the position of the driven wheel and the driving wheel while protecting the transmission belt.

BRIEF DESCRIPTION OF THE DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, and therefore should not be considered as limitation to the scope, a person ordinarily skilled in the art still could obtain other relevant drawings according to these accompanying drawings, without using creative efforts.

DESCRIPTION OF CURRENT EMBODIMENTS

Reference signs: 100—air fryer; 101—air fryer body; 102—cooking cavity; 103—oil receiving pot for air fryer; 104—pizza grill for an air fryer; 105—novel frying basket for an air fryer; 106—mounting cavity; 107—pizza placement cavity; 1—air duct plate; 11—edge; 2—bottom bracket; 3—passing-air reflux port; 4—oil receiving tray; 61—bottom plate; 62—rear side surface; 63—front side surface; 64—inclined side surface; 65—inlet hole; 66—bulge; 5—support leg; 7—guide convex rib; 8—heating pipe; 9—hot air passage; 10—guide plate; 18—handle; 19—top shielding plate; 191—frame-shaped socket; 192—rectangular hole; 20—lever; 201—insertion rod; 202—insertion board; 203—step; 204—hook; 21—ventilation hole; 22—first handle portion; 221—first clamping groove; 23—erection plate; 231—second clamping groove; 25—basket body; 26—bottom convex bulge; 27—first bottom inlet hole; 28—oil leakage hole; 29—side convex bulge; 30—side inlet hole; 31—second handle portion; 32—second bottom inlet hole; 40—fan assembly; 401—bearing bracket; 402—heat dissipation wind wheel; 403—heat circulation wind wheel; 404—rotating shaft; 405—bearing; 406—bearing limiting groove; 41—transmission assembly; 411—transmission belt; 412—driving wheel; 413—driven wheel; 42—motor bracket; 43—motor; 431—motor shaft; 44—motor heat dissipation fan; 45—bracket; 451—limiting groove; 452—folded edge; 453—limiting hole; 200—pizza.

The technical solutions in the embodiments of the present disclosure will be described clearly and completely below in conjunction with the accompanying drawings in the embodiments of the present disclosure, and apparently, some but not all embodiments of the present disclosure are described. Based on the embodiments in the present disclosure, all of other embodiments obtained by a person ordinarily skilled in the art without using creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "center", "upper", "lower", "left", "right", "vertical", "horizontal", "inner", and "outer" are based on orientation or positional relationships as shown in the accompanying drawings, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure.

Besides, terms such as "first", "second", and "third", if appear, are merely for distinctive description, but should not be construed as indicating or implying relative importance.

Moreover, terms such as "horizontal", "vertical", and "pendulous", if appear, do not mean that a component is required to be absolutely horizontal or pendulous, but mean that the component may be slightly inclined. For example, by "horizontal" it merely means that a structure is more horizontal in comparison with "vertical", rather than being completely horizontal, while the structure may be slightly inclined.

In the description of the present disclosure, it also should be indicated that unless expressly otherwise specified and defined, terms such as "provide", "mount", "link", and "connect", if appear, should be understood in a broad sense, for example, connection may be fixed connection, detachable connection, or integrated connection; it may be mechanical connection or electrical connection; it may be direct joining or indirect joining through an intermediate medium, and it also may be inner communication between two elements. For a person ordinarily skilled in the art, specific meanings of the above-mentioned terms in the present disclosure could be understood according to specific circumstances.

It should be noted that the features of the embodiments in the present disclosure may be combined with each other if there is no conflict.

The air fryer is a kitchen appliance that is favorite now. Many people like to bake pizza at home, and also want to bake pizza using the air fryer. However, if the pizza is baked with an inner pot of the existing air fryer, the hot air circulation cannot be formed due to a big area of pizza and thus the heating is not uniform, then the baking effect of pizza is not ideal, therefore, a new structure is needed to satisfy the requirements of baking pizza with an air fryer.

Figure 1:
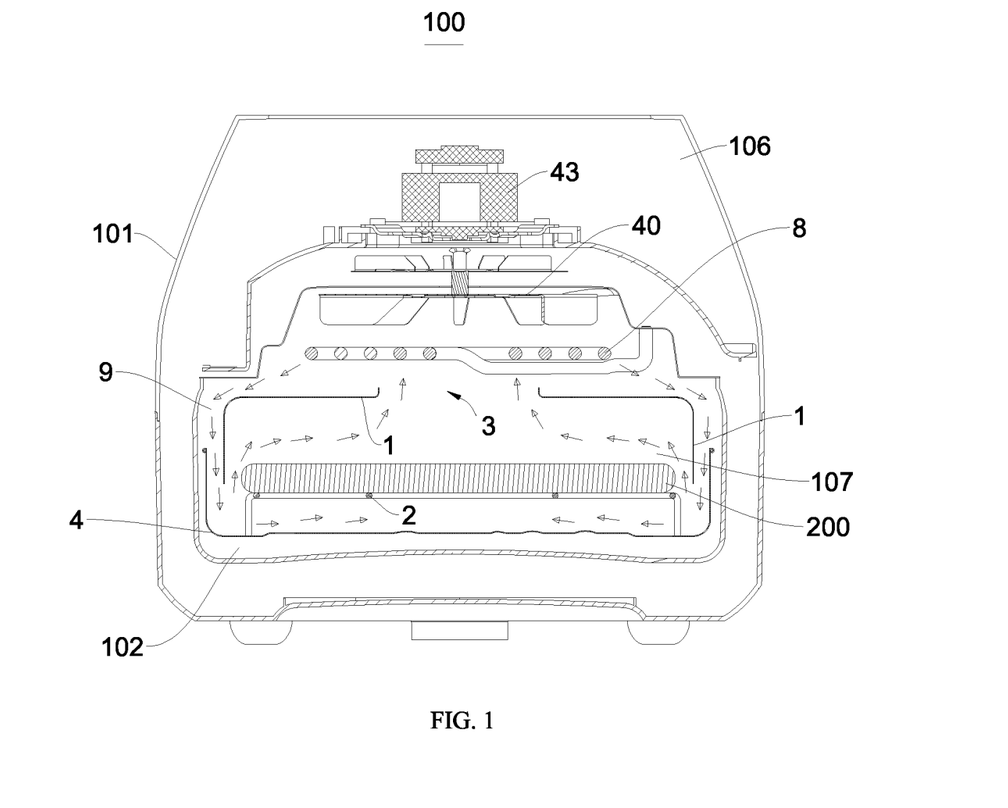
FIG. 1 is a schematic view of a use state of a first type of air fryer provided in an embodiment of the present disclosure.
Figure 2:
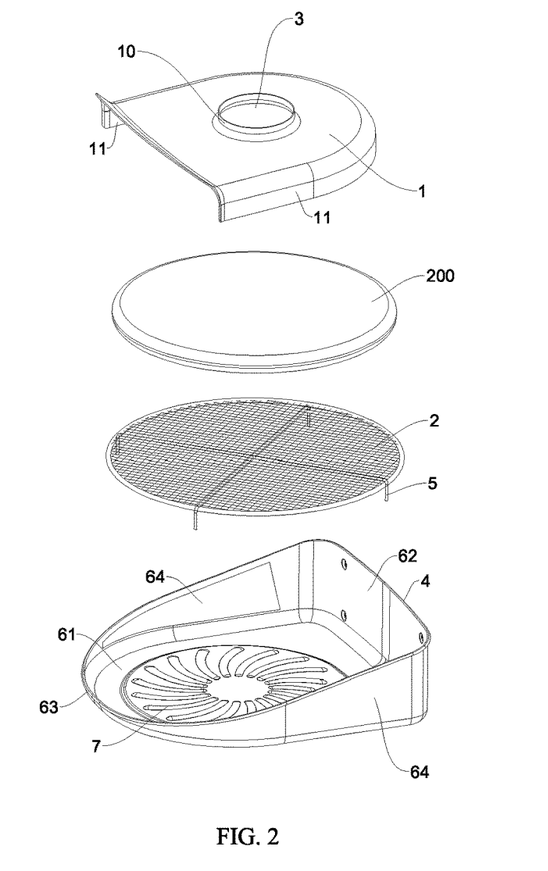
FIG. 2 is a schematic partial exploded view of the first type of air fryer provided in an embodiment of the present disclosure.

As shown in FIG. 1 and FIG. 2, an embodiment of the present disclosure provides an air fryer 100 applicable for cooking a pizza 200, which may meet the requirements of baking the pizza 200 with the air fryer 100.

Specifically, the air fryer 100 includes a bottom bracket 2 provided in a cooking cavity 102 of the air fryer 100, an air duct plate 1 is provided between an upper part of the bottom bracket 2 and a heating pipe 8 on the top of the cooking cavity 102, a passing-air reflux port 3 is provided in the middle of the air duct plate 1, an edge of the air duct plate 1 extends downwards to form a hot air passage 9 with an inner wall of the cooking cavity, and a pizza placement cavity 107 is formed between the bottom bracket 2 and the air duct plate 1.

In conjunction with FIG. 1, a motor 43 above the heating pipe 8 drives a fan assembly 40 to rotate, so as to drive the hot airflow generated by the heating pipe 8 to be guided into the bottom of the pizza 200 through the hot air passage 9, then enters the inside of the air duct plate 1, and finally flows back to a heat-generating region at the top through the passing-air reflux port 3 in the middle of the air duct plate 1, thereby forming a circulation circuit, so that the food is heated more uniformly.

In order to better allow the hot airflow to enter a lower part of the bottom bracket 2, the bottom of the bottom bracket 2 is provided with support legs 5. The support legs 5 are arranged in a cross shape at the bottom of the bottom bracket 2, and the support legs 5 serve to support at four points, which has a stable support effect. This structure enables the bottom of the bottom bracket 2 to be empty and allows the hot airflow to enter smoothly.

In the above, an edge of the passing-air reflux port 3 is provided with a guide plate 10 being in an annular shape and extending upwardly, which can guide the hot airflow passing through the passing-air reflux port 3, thereby avoiding the generation of turbulence.

In the present embodiment, in conjunction with FIG. 2, a lower end of the bottom bracket 2 is provided with a removable oil receiving tray 4, the bottom bracket 2 is provided in the oil receiving tray 4, and the oil receiving tray 4 bears the bottom bracket 2, and can be configured to collect oil falling from the pizza 200.

In the above, a bottom surface of the oil receiving tray 4 is arranged with guide convex ribs 7 spirally around the center, to conduct heat for the hot airflow entering the bottom of the bottom bracket 2, so that the heating is more uniform and quick. Side walls at two sides of the oil receiving tray 4 are in a wedge shape, thereby facilitating the pickup and placement of the oil receiving tray 4.

In order to quickly pick up the oil receiving tray 4, a handle 18 (shown in FIG. 5) is mounted on a rear side of the oil receiving tray 4.

In order to allow the hot airflow in the hot air passage 9 to flow smoothly into the oil receiving tray 4, a distance between side walls of the oil receiving tray 4 at two sides is greater than a distance between edges 11 extending downward of the air duct plate 1 at two sides, and at least part of the edges 11 of the air duct plate 1 extend downward into the oil receiving tray 4.

In the above, the pizza 200 may also be replaced with other food to be baked, for example, steaks, chicken legs, etc.

In combination with FIG. 1 and FIG. 2, in one specific embodiment, the air fryer 100 includes an air fryer body 101, an air duct plate 1, a bottom bracket 2, an oil receiving tray 4, support legs 5, guide convex ribs 7, a heating pipe 8, a guide plate 10, a fan assembly 40 and a motor 43, wherein the heating pipe 8, the fan assembly 40 and the motor 43 are all mounted on the air fryer body 101, the motor 43 is located in the mounting cavity 106 of the air fryer body 101, the heating pipe 8 and the fan assembly 40 are located in the cooking cavity 102 of the air fryer body 101, and the mounting cavity 106 and the cooking cavity 102 are isolated from each other. The motor 43 drives the fan assembly 40 to rotate, and the airflow generated thereby flows towards the heating pipe 8. The cooking cavity 102 accommodates the oil receiving tray 4, the support legs 5 supporting on a bottom wall of the oil receiving tray 4, a bottom bracket 2 supported by the support legs 5, the pizza 200 placed on the bottom bracket 2 and an air duct plate 1 covered above the pizza 200. The top of the air duct plate 1 is provided with the guide plate 10 in an annular shape, the passing-air reflux port 3 is defined inside the guide plate 10, and the passing-air reflux port 3 is located directly below the heating pipe 8. An edge 11 of the air duct plate 1 extends downward into the oil receiving tray 4, and defines, with the bottom bracket 2, a pizza placement cavity 107 configured to accommodate the pizza 200. Specifically, the oil receiving tray 4 includes a bottom plate 61, a front side surface 63, a rear side surface 62 and inclined side surfaces 64 oppositely arranged, wherein the front side surface, the rear side surface and the inclined side surfaces enclose edges of the bottom plate 61, and the bottom plate 61 is arranged with guide convex ribs 7 spirally around the center.

In the present embodiment, the airflow generated by the fan assembly 40 forms a hot airflow after passing through the heating pipe 8. The hot airflow directly enters the hot air passage 9 defined between the inner wall of the cooking cavity 102 and the edge 11 of the air duct plate 1, and subsequently can directly bake an upper surface of the pizza 200 located on the bottom bracket 2, and also can bake a lower surface of the pizza 200 after passing through the bottom bracket 2, finally, the airflow flows out through the passing-air reflux port 3 at the top of the air duct plate 1, is re-heated by the heating pipe 8, and then enters the next cycle.

In order to reduce the loss of hot airflow caused by the oil receiving tray 4, as shown in FIG. 3-FIG. 6, the present embodiment provides an oil receiving pot for air fryer 103, which includes a bottom plate 61, both a front side and a rear side of the bottom plate 61 are vertically provided with a front side surface 63 and a rear side surface 62, respectively, the height of the front side surface 63 is lower than the height of the rear side surface 62, and left and right sides of the bottom plate 61 transitionally connect the front side surface 63 and the rear side surface 62 by an inclined side surface 64 having an inclined surface at the top. The oil receiving pot for air fryer 103 can be removed from the air fryer 100, and it has a low end and a high end on the whole, which makes it easy and convenient to remove the food or vessel in the pot body, and also can reduce the loss of hot airflow. The oil receiving pot for air fryer 103 herein may be understood as the above oil receiving tray 4.

Figure 3:
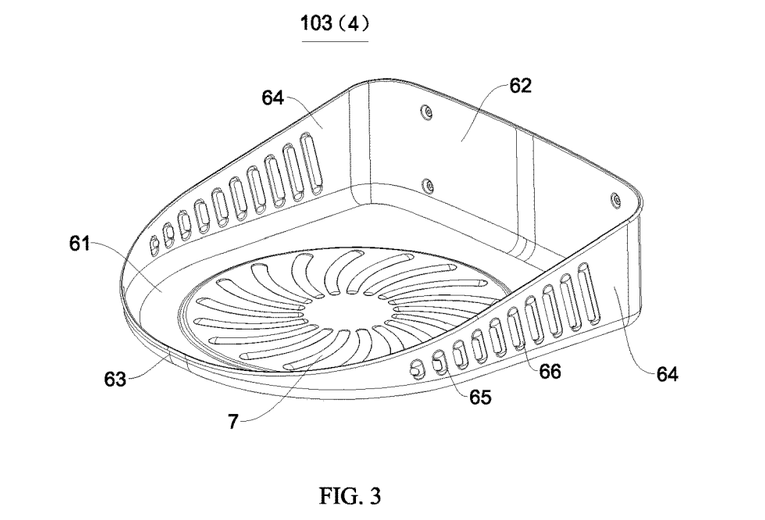
FIG. 3 is a schematic structural view of an oil receiving pot for air fryer provided in an embodiment of the present disclosure, from a first perspective.
Figure 4:
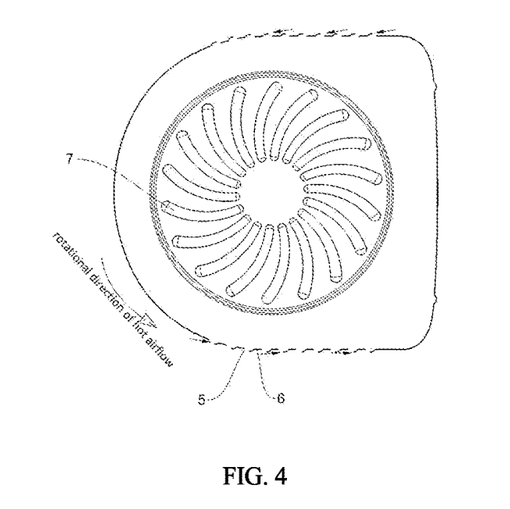
FIG. 4 is a schematic structural view of an oil receiving pot for air fryer provided in an embodiment of the present disclosure, from a second perspective.
Figure 5:
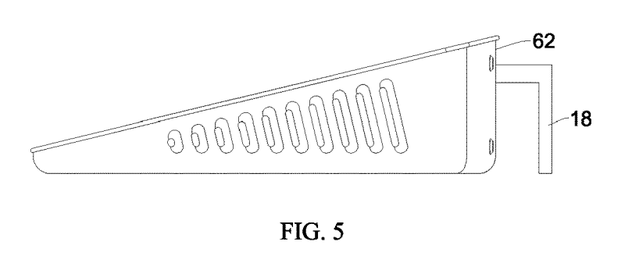
FIG. 5 is a schematic structural view of an oil receiving pot for air fryer provided in an embodiment of the present disclosure, from a third perspective.

In the above, an upper side of the bottom plate 61 is provided with several guide convex ribs 7 spirally arranged around the center, and a spiral direction of the guide convex ribs 7 is consistent with a rotational direction of hot airflow, for the effect of enabling the hot airflow at the bottom to more orderly and uniformly transmit heat to the center of the bottom of the pot, without causing the phenomenon of turbulence.

In order to enable the hot airflow to quickly enter the oil receiving pot for air fryer 103, each inclined side surface 64 is provided with several bulges 66, and an inlet hole 65 is provided on one side of each bulge 66. All of the bulges 66 and the inlet holes 65 are elongated, and all of the bulges 66 and the inlet holes 65 are arranged obliquely. The inlet holes 65 are disposed on a side of the bulges 66 facing the rotational direction of the hot airflow inside the air fryer 100, so that the hot airflow can smoothly enter the pot through the inlet holes 65 to heat, and thus the efficiency of air inlet is improved.

In order to facilitate the pickup and placement of the oil receiving pot for air fryer 103 from and into the air fryer 100, the rear side of the rear side surface 62 is mounted with a handle 18, so that the oil receiving pot for air fryer 103 can be picked up and placed conveniently.

Figure 6:
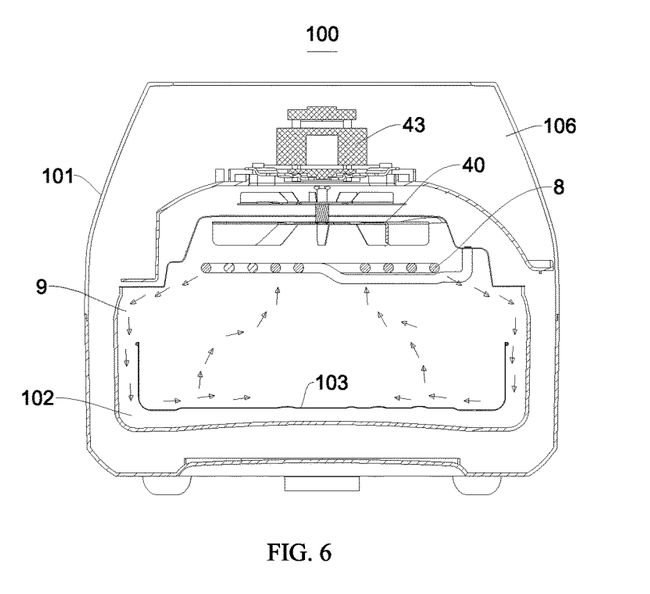
FIG. 6 is a schematic view of a use state of a second type of air fryer provided in an embodiment of the present disclosure.

In the present embodiment, as shown in FIG. 6, food is placed in the oil receiving pot for air fryer 103, and placed in the cooking cavity 102 of the air fryer 100, and the hot airflow enters the oil receiving pot for air fryer 103 from the inlet holes 65 on the relatively low front side surface 63 and the inclined side surfaces 64, and is spirally concentrated along the guide convex ribs 7, to bake the food, without any turbulence.

Generally, the pizza 200 has a relatively big area, and sometimes the hot airflow flowing from the above cannot uniformly heat the pizza 200, then there may be cases where the upper surface of the pizza 200 is over-baked, while the lower surface is not baked enough.

As shown in FIG. 7-FIG. 13, the present embodiment provides a pizza grill for air fryer 104, including a bottom bracket 2 and a top shielding plate 19 mounted above the bottom bracket 2, wherein ventilation holes 21 are densely distributed on the top shielding plate 19, and a pizza placement cavity 107 is formed between the bottom bracket 2 and the top shielding plate 19. In this way, the top shielding plate 19 is configured to shield the baking of the top of the fryer to the surface of the pizza 200, and the densely distributed ventilation holes 21 facilitate hot airflow circulation on the surface of the pizza 200 and can prevent over-baking of the surface of the pizza 200.

Figure 13:
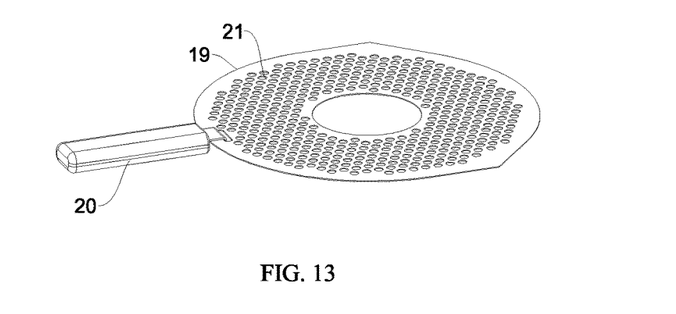
FIG. 13 is a schematic view when a top shielding plate of the pizza grill for an air fryer provided in an embodiment of the present disclosure is used as a pizza shovel.

The pizza grill for air fryer 104 further includes a lever 20, the lever 20 is detachably inserted into one side of the top shielding plate 19, and when the lever 20 is inserted and connected to the top shielding plate 19, the lever 20 and the top shielding plate 19 together can be used as a pizza shovel, to shovel the pizza 200 baked on the bottom bracket 2 and place the pizza on a plate.

Figure 7:
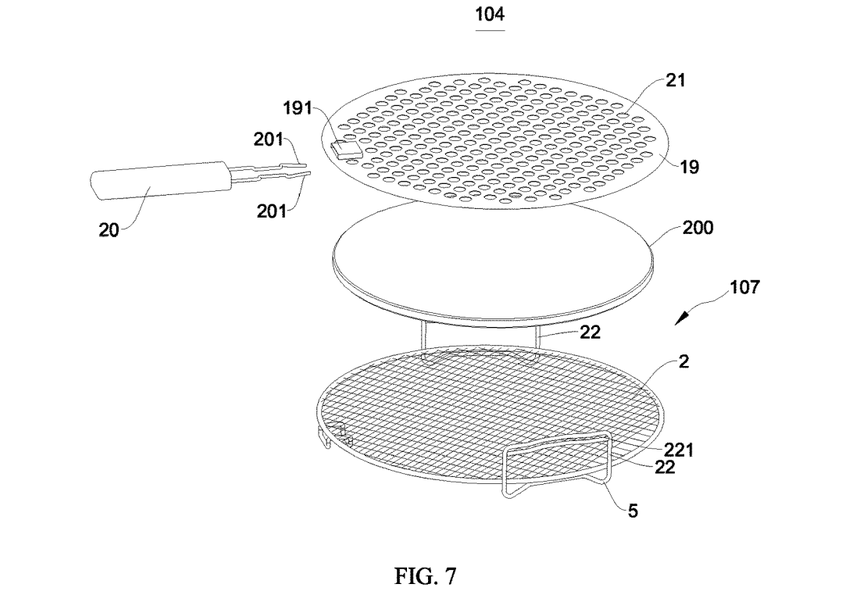
FIG. 7 is a schematic structural view of a pizza grill for an air fryer provided in an embodiment of the present disclosure, from a first perspective.
Figure 8:
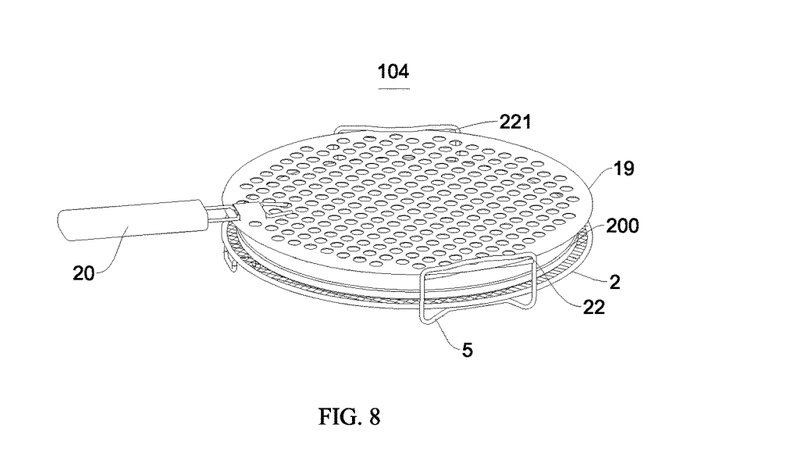
FIG. 8 is a schematic structural view of a pizza grill for an air fryer provided in an embodiment of the present disclosure, from a second perspective.
Figure 9:
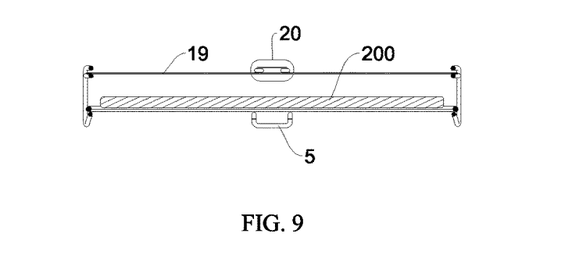
FIG. 9 is a schematic structural view of a pizza grill for an air fryer provided in an embodiment of the present disclosure, from a third perspective.

There are several detachable insertion structures for the lever 20. One structure is as shown in FIG. 7, wherein two insertion rods 201 are arranged side by side at a front end of the lever 20, wherein a middle part of each insertion rod 201 is recessed inwardly, and an end portion of each insertion rod is inclined inwardly. The top shielding plate 19 may be provided with a raised frame-shaped socket 191, and two insertion rods 201 may be directly inserted into the frame-shaped socket 191. Inward recesses of the insertion rods 201 are buckled with side walls of the frame-shaped socket 191, then the insertion can be completed. When disassembling, the insertion rods 201 can be disengaged from the frame-shaped socket 191 just by pressing end portions of the two insertion rods 201 toward the middle, thus realizing disassembling.

Figure 10:
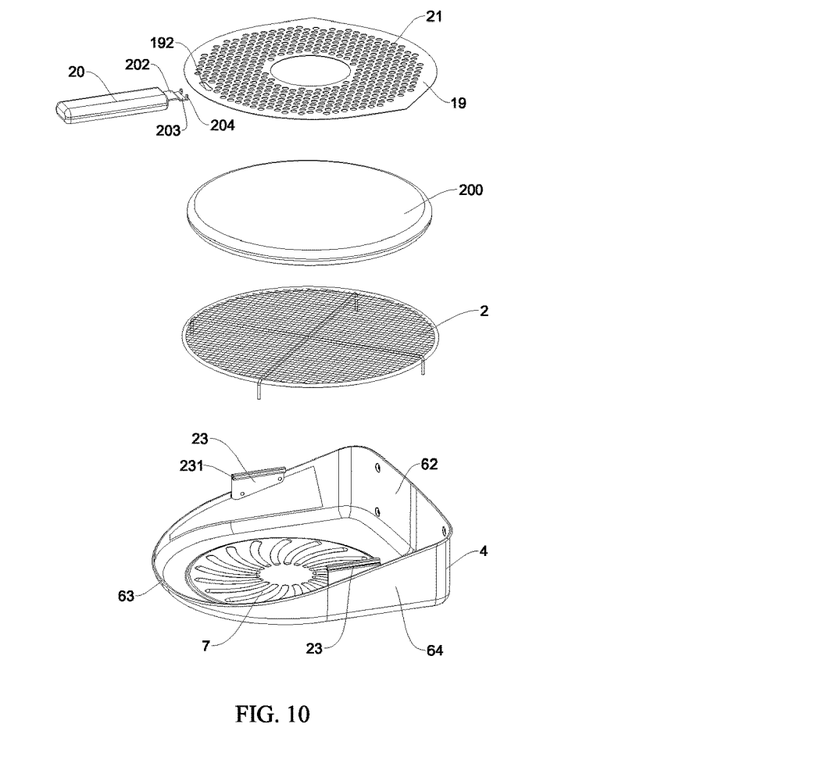
FIG. 10 is a schematic structural view of a pizza grill for an air fryer provided in an embodiment of the present disclosure, from a fourth perspective.

Another structure is as shown in FIG. 10, wherein a front end of the lever 20 is an insertion board 202, a front end of the insertion board 202 is provided with a step 203 bent downwardly, a front end of the step 203 is provided with a pair of hooks 204, a rectangular hole 192 is provided on the top shielding plate 19, the insertion board 202 is inserted into the rectangular hole 192, and the step 203 is located below the top shielding plate 19, meanwhile, the hooks 204 are inserted into the rectangular hole, in this way the top shielding plate 19 can be lifted, realizing a detachable connection.

In order to make the bottom of the bottom bracket 2 empty, and enable the hot airflow to flow in to bake the lower surface of the pizza 200, a lower side of the bottom bracket 2 is provided with support legs 5.

In the above, as shown in FIG. 7, two sides of the bottom bracket 2 are each provided with a first handle portion 22, an upper portion of the first handle portion 22 is provided with a first clamping groove 221, and the top shielding plate 19 is detachably fixed in the first clamping grooves 221. In order to reduce the parts and enhance the overall strength, a part of the support legs 5 are located below the first handle portions 22, and are integrated with the first handle portions 22.

Figure 11:
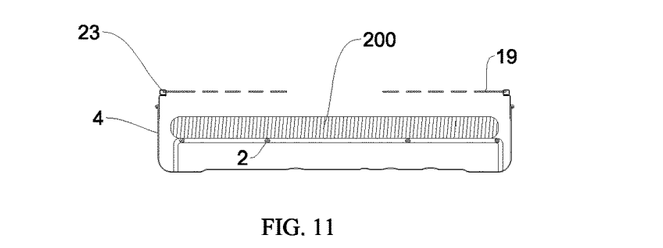
FIG. 11 is a schematic structural view of a pizza grill for an air fryer provided in an embodiment of the present disclosure, from a fifth perspective.
Figure 12:
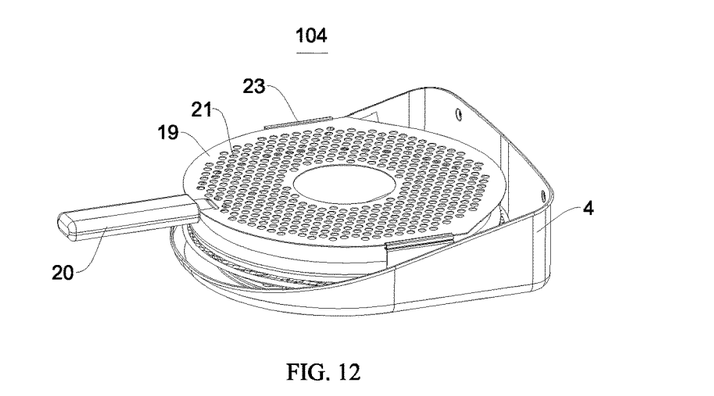
FIG. 12 is a schematic structural view of a pizza grill for an air fryer provided in an embodiment of the present disclosure, from a sixth perspective.

In the present embodiment, as shown in FIG. 11-FIG. 13, the pizza grill for air fryer 104 further includes an oil receiving tray 4, the bottom bracket 2 is placed in the oil receiving tray 4, and two sides of the oil receiving tray 4 are each provided with an erection plate 23, an upper end of each erection plate 23 is provided with a second clamping groove 231, the top shielding plate 19 is detachably fixed in the second clamping grooves 231, and the bottom of the oil receiving tray 4 is provided with guide convex ribs 7 arranged spirally around the center, to realize better guiding and heating, and improve the baking effect.

In order to reduce the loss of hot airflow when a frying basket is used in the air fryer, as shown in FIG. 14-FIG. 18, the present embodiment provides a novel frying basket for air fryer 105, including a basket body 25 shaped as a circular basket, a bottom surface of the basket body 25 is provided with bottom convex bulges 26, the bottom convex bulges 26 are provided with first bottom inlet holes 27, and the first bottom inlet holes 27 may better realize heating of the food with inlet air.

In the present embodiment, the basket body 25 is shaped as a circular basket, and the bottom convex bulges 26 are spiral ventilation bulges radially arranged around the center of the basket body 25, and are configured to allow the hot airflow entering the bottom of the basket body 25 to more orderly and uniformly transmit heat to the center of the bottom, without causing the phenomenon of turbulence. In the above, the bottom convex bulges 26 are provided with several first bottom inlet holes 27 along the length direction, and the area of the first bottom inlet holes 27 can be increased. Meanwhile, second bottom inlet holes 32 are also provided at intervals, on the bottom surface of the basket body 25, between adjacent bottom convex bulges 26. There will be a free space between the bottom convex bulges 26, and providing the second bottom inlet holes 32 in the free space also can ensure smooth air inlet at the bottom.

Figure 14:
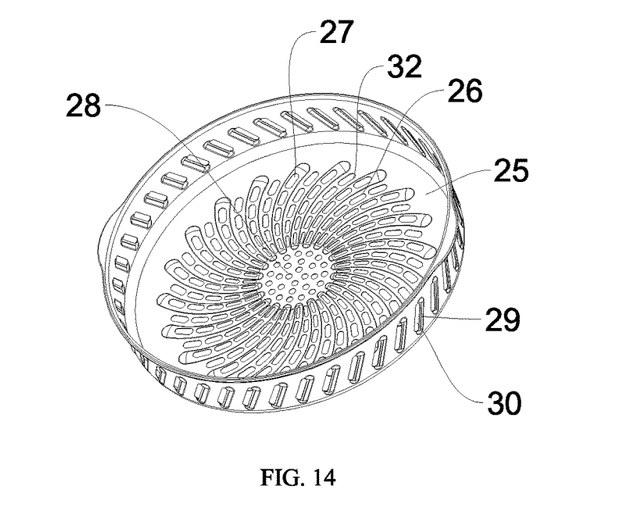
FIG. 14 is a schematic structural view of a novel frying basket for an air fryer provided in an embodiment of the present disclosure, from a first perspective.
Figure 15:
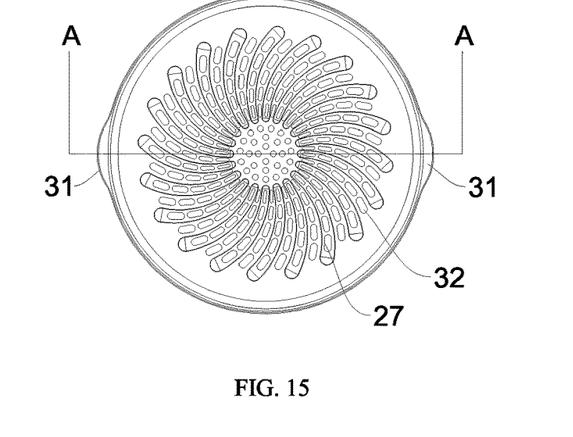
FIG. 15 is a schematic structural view of the novel frying basket for an air fryer provided in an embodiment of the present disclosure, from a second perspective.
Figure 16:
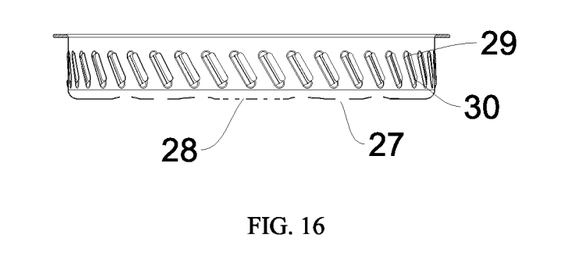
FIG. 16 is a sectional view along A-A direction in FIG. 15.
Figure 17:
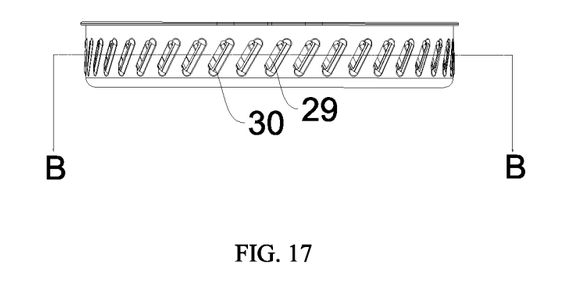
FIG. 17 is a schematic structural view of a novel frying basket for an air fryer provided in an embodiment of the present disclosure, from a third perspective.
Figure 18:
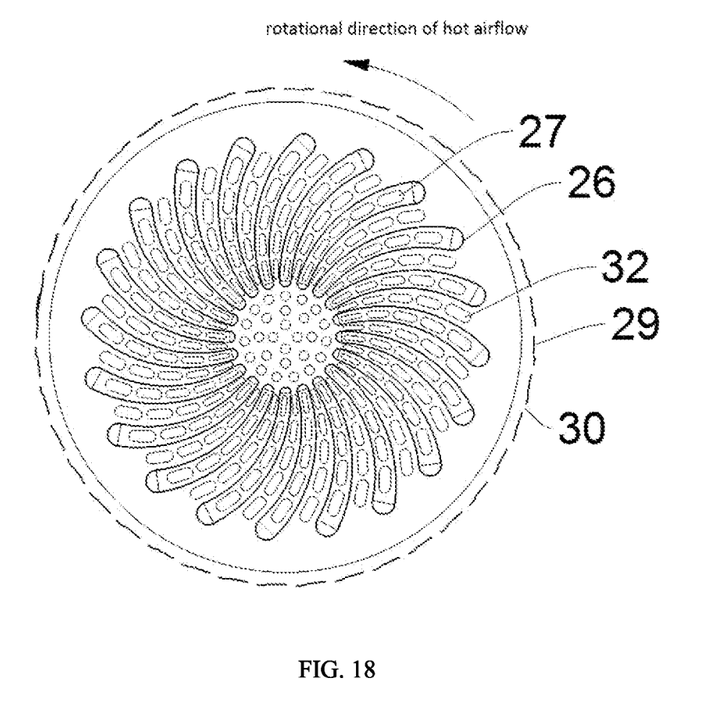
FIG. 18 is a sectional view along B-B direction in FIG. 17.

In the present embodiment, side convex bulges 29 are uniformly provided circumferentially on an outer side wall of the basket body 25, and side inlet holes 30 are provided on a side of the side convex bulges 29 facing the rotational direction of the hot airflow inside the air fryer. The spiral hot airflow can directly enter into the basket body 25 through the side inlet holes 30, to heat the food omnidirectionally, wherein the side convex bulges 29 are arranged obliquely, so that the air inlet effect is better.

Optionally, all of the side inlet holes 30 and/or the first bottom inlet holes 27 are elongated, so that the external hot airflow quickly enters into the novel frying basket for air fryer 105.

In order to prevent the oil liquid from remaining in the basket body 25, oil leakage holes 28 are provided in the middle of the bottom surface of the basket body 25. The oil dripping from the food may drop from the first bottom inlet holes 27 and the second bottom inlet holes 32, or may drop through the oil leakage holes 28 along edges of the first bottom inlet holes 27 and the second bottom inlet holes 32.

In order to facilitate the pickup and placement of the novel frying basket for air fryer 105, top portions of side walls of the basket body 25 at two sides are symmetrically provided with a second handle portion 31 extending outward, then the frying basket can be conveniently lifted up.

Figure 19:
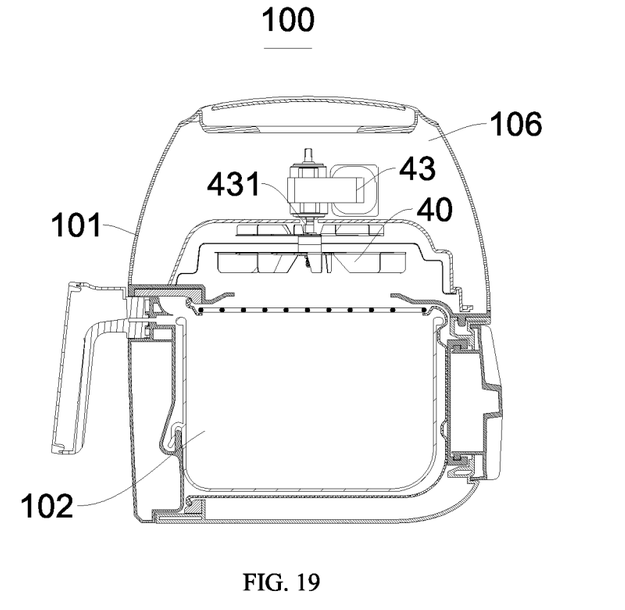
FIG. 19 is a schematic structural view of a third type of air fryer provided in an embodiment of the present disclosure.

With regard to the air fryer 100 shown in FIG. 19, a fan assembly 40 is provided above the cooking cavity 102, the motor 43 driving the fan assembly 40 is provided above the fan assembly 40, and a motor shaft 431 of the motor 43 is directly connected to the fan assembly 40, which leads to a very high overall height of the air fryer 100. As shown in FIG. 20-FIG. 23, a novel air fryer 100 provided in the present embodiment has a relatively low overall height.

Figure 20:
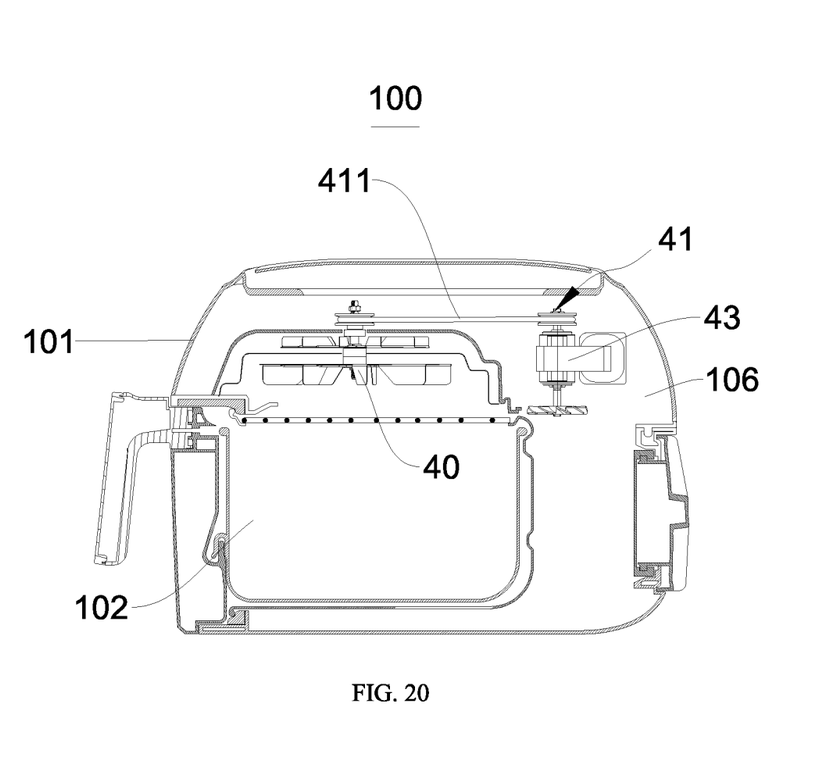
FIG. 20 is a schematic structural view of a fourth type of air fryer provided in an embodiment of the present disclosure.

Specifically, the air fryer 100 includes an air fryer body 101, a fan assembly 40 is provided inside the air fryer body 101 close to the top, a motor 43 is mounted on a side of the fan assembly 40, and the motor 43 is connected to the fan assembly 40 by a transmission assembly 41 so as to drive the fan assembly 40 to rotate.

By means of the transmission assembly 41, it is realized that the motor 43 located at the side of the fan assembly 40 drives the fan assembly 40 to rotate synchronously, so that no motor needs to be mounted at the top of the fan assembly 40, thus the overall height of the air fryer 100 can be greatly reduced.

Figure 21:
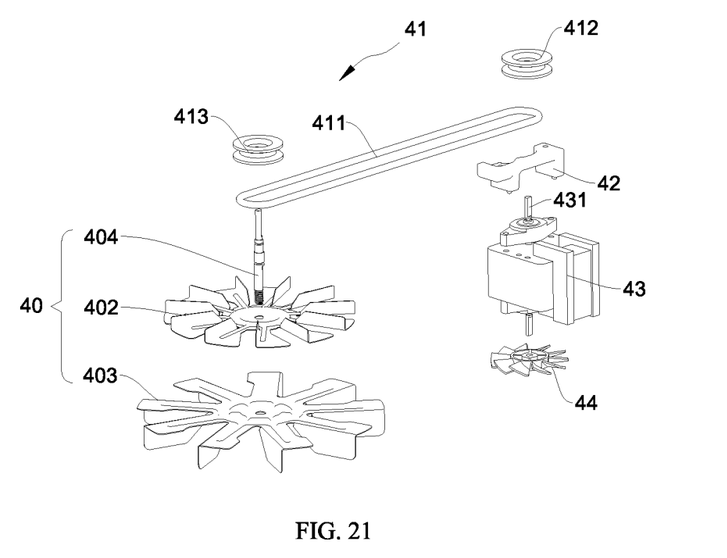
FIG. 21 is a schematic partial exploded structural view of a structure of the fourth type of air fryer provided in an embodiment of the present disclosure.
Figure 22:
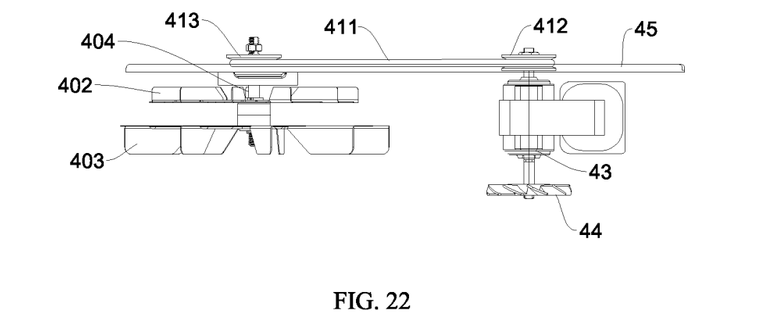
FIG. 22 is a schematic partial front structural view of another structure of the fourth type of air fryer provided in an embodiment of the present disclosure.

In combination with FIG. 21, in one mode, the fan assembly 40 includes a heat dissipation wind wheel 402 and a heat circulation wind wheel 403 arranged coaxially up and down, and the heat dissipation wind wheel and the heat circulation wind wheel are connected through a central rotating shaft 404.

The transmission assembly 41 includes a driven wheel 413 mounted on the rotating shaft 404 and a driving wheel 412 mounted at an upper end of the motor shaft 431 of the motor 43. The driven wheel 413 and the driving wheel 412 are connected by a transmission belt 411. The driven wheel 413 and the driving wheel 412 can be driven by the transmission belt 411 to rotate synchronously. Here, the transmission belt 411 may be a belt with a circular cross section.

In another mode, a bracket 45 is mounted on the lower side of the transmission assembly 41, and the bracket 45 is configured to horizontally limit the position of the driven wheel 413 and the driving wheel 412 while protecting the transmission belt 411. In the above, the bracket 45 has a plate-like shape, and can block the hot airflow flowing from the cooking cavity 102 below, then the hot airflow cannot affect the transmission belt 411. As the transmission belt 411 is a rubber belt in most cases, the rubber material will harden and fail if heated for a long time.

Figure 23:
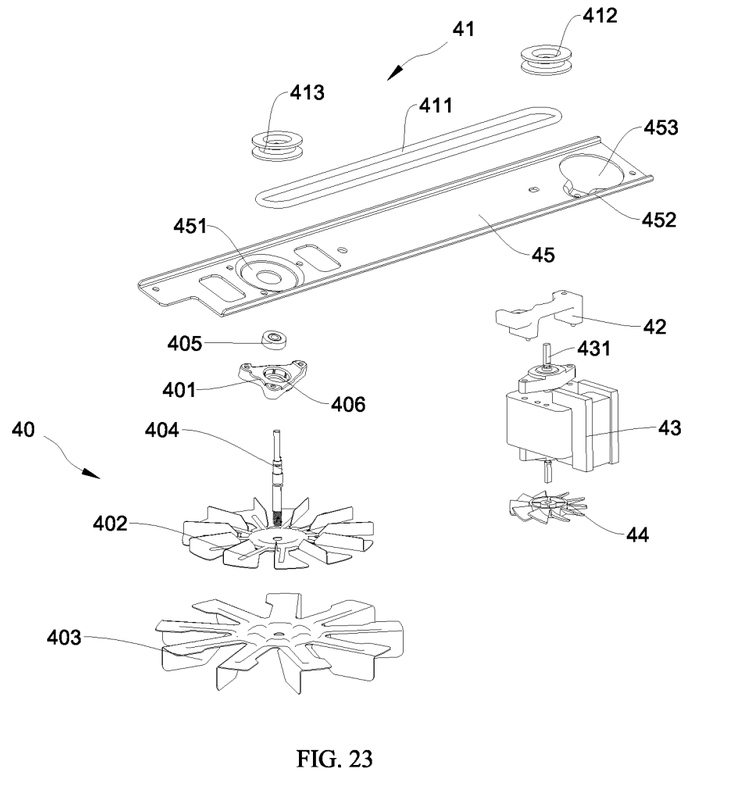
FIG. 23 is a schematic partial exploded structural view of another structure of the fourth type of air fryer provided in an embodiment of the present disclosure.

Likewise, in combination with FIG. 23, edges of the bracket 45 at two sides are each provided with an upward folded edge 452, and the transmission belt 411 is located between the folded edges 452 at the two sides, then the folded edges 452 can better protect the transmission belt 411.

In order to better horizontally limit the position of the driven wheel 413 and the driving wheel 412, the bracket 45 is provided with a limiting groove 451 and a limiting hole 453, the driven wheel 413 is embedded in the limiting groove 451, and the driving wheel 412 is embedded in the limiting hole 453.

In the above, a bearing bracket 401 located below the limiting groove 451 is mounted on a lower side of the bracket 45, a bearing limiting groove 406 is provided on the bearing bracket 401, and the rotating shaft 404 is configured to pass through the bearing bracket 401, and connect with a bearing 405 in the bearing limiting groove 406, and the bearing 405 and the bearing bracket 401 can limit the position of the rotating shaft 404.

In order to facilitate the mounting of the motor 43, the motor 43 is mounted and fixed in the air fryer body 101 by a motor bracket 42.

In addition, a motor heat dissipation fan 44 is mounted below the motor 43, and the motor heat dissipation fan 44 is mounted on the motor shaft 431 extending from a lower end of the motor 43. The motor heat dissipation fan 44 will rotate synchronously while the motor shaft 431 rotates, then the heat dissipation effect of the motor 43 is improved, and the motor heat dissipation fan 44 can also accelerate the air flow in the air fryer 100 and improve the cooling effect.

Although the present disclosure has been described above with reference to the embodiments, various improvements may be made thereto and components therein may be replaced by equivalents, without departing from the scope of the present disclosure. In particularly, as long as there is no structural conflict, all of various features in the embodiments disclosed in the present disclosure may be used in combination with each in any manner, while these combinations are not exhaustively described in the present description only for the sake of saving spaces and resources. Therefore, the present disclose is not restricted to specific embodiments disclosed herein, but covers all technical solutions falling within the scope of the claims.

INDUSTRIAL APPLICABILITY

To sum up, the present disclosure provides an air fryer applicable for cooking pizza, a novel frying basket for an air fryer and a novel air fryer, which can realize uniform heating, and has good baking effect.

The embodiments of the invention in which an exclusive property or privilege is claimed are defined as follows:

1. An air fryer applicable for cooking a pizza, comprising a bottom bracket provided in a cooking cavity of the air fryer, wherein an air duct plate is provided between an upper part of the bottom bracket and a heating pipe on a top of the cooking cavity, a passing-air reflux port is provided in a middle of the air duct plate, an edge of the air duct plate extends downwards to form, together with an inner wall of the cooking cavity, a hot air passage, and a pizza placement cavity is formed between the bottom bracket and the air duct plate, wherein a lower end of the bottom bracket is provided with a removable oil receiving tray, and the bottom bracket is provided in the oil receiving tray, wherein a distance between side walls of the oil receiving tray at two sides is greater than a distance between edges extending downward of the air duct plate at two sides; and at least part of the edges of the air duct plate extend downward into the oil receiving tray.

2. The air fryer applicable for cooking a pizza according to claim 1, wherein a bottom of the bottom bracket is provided with support legs, wherein the support legs are arranged in a cross shape at the bottom of the bottom bracket.

3. The air fryer applicable for cooking a pizza according to claim 1, wherein an edge of the passing-air reflux port is provided with a guide plate, wherein the guide plate is in a circular shape and extends upwardly.

4. The air fryer applicable for cooking a pizza according to claim 1, wherein a bottom surface of the oil receiving tray is provided spirally with guide convex ribs around a center of the oil receiving tray.

5. The air fryer applicable for cooking a pizza according to claim 1, wherein the oil receiving tray comprises a bottom plate, wherein a front side and a rear side of the bottom plate are vertically provided with a front side surface and a rear side surface, respectively, a height of the front side surface is lower than a height of the rear side surface, and left and right sides of the bottom plate are connected with the front side surface and the rear side surface, through inclined side surfaces each having an inclined surface at a top.

6. The air fryer applicable for cooking a pizza according to claim 5, wherein the inclined side surfaces are each provided with several bulges, and an inlet hole is provided on one side of each of the bulges.

7. The air fryer applicable for cooking a pizza according to claim 6, wherein all of the bulges and inlet holes are elongated;

all of the bulges and the inlet holes are arranged obliquely; and the inlet holes are disposed on a side of the bulges facing a rotational direction of hot airflow inside the air fryer.

8. The air fryer applicable for cooking a pizza according to claim 1, wherein a rear side of the oil receiving tray is mounted with a handle.

9. The air fryer applicable for cooking a pizza according to claim 1, wherein a top shielding plate is arranged above the bottom bracket, ventilation holes are densely distributed on the top shielding plate, and the pizza placement cavity is formed between the bottom bracket and the top shielding plate.

10. The air fryer applicable for cooking a pizza according to claim 9, wherein the air fryer applicable for cooking a pizza further comprises a lever, wherein the lever is detachably inserted into one side of the top shielding plate.

11. The air fryer applicable for cooking a pizza according to claim 9, wherein two sides of the bottom bracket are each provided with a first handle portion, an upper portion of the first handle portion is provided with a first clamping groove, and the top shielding plate is detachably fixed in the first clamping groove.

12. The air fryer applicable for cooking a pizza according to claim 9, wherein the bottom bracket is provided in the oil receiving tray;
    two sides of the oil receiving tray are each provided with an erection plate, an upper end of the erection plate is provided with a second clamping groove, and the top shielding plate is detachably fixed in the second clamping groove.

13. An air fryer applicable for cooking a pizza, comprising a bottom bracket provided in a cooking cavity of the air fryer, wherein an air duct plate is provided between an upper part of the bottom bracket and a heating pipe on a top of the cooking cavity, a passing-air reflux port is provided in a middle of the air duct plate, an edge of the air duct plate extends downwards to form, together with an inner wall of the cooking cavity, a hot air passage, and a pizza placement cavity is formed between the bottom bracket and the air duct plate,
    wherein a top shielding plate is arranged above the bottom bracket, ventilation holes are densely distributed on the top shielding plate, and the pizza placement cavity is formed between the bottom bracket and the top shielding plate;
    wherein the air fryer applicable for cooking a pizza further comprises an oil receiving tray, and the bottom bracket is provided in the oil receiving tray;
    two sides of the oil receiving tray are each provided with an erection plate, an upper end of the erection plate is provided with a second clamping groove, and the top shielding plate is detachably fixed in the second clamping groove.

* * * * *